(12) United States Patent
Park et al.

(10) Patent No.: US 9,965,033 B2
(45) Date of Patent: May 8, 2018

(54) USER INPUT METHOD AND PORTABLE DEVICE

(71) Applicant: Samsung Electronics Co., Ltd., Suwon-si (KR)

(72) Inventors: Joonah Park, Seoul (KR); Du Sik Park, Suwon-si (KR); Tae Sung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/319,085

(22) Filed: Jun. 30, 2014

(65) Prior Publication Data

US 2015/0324000 A1    Nov. 12, 2015

(30) Foreign Application Priority Data

May 7, 2014  (KR) .................. 10-2014-0054324
Jun. 27, 2014 (KR) .................. 10-2014-0079600

(51) Int. Cl.
| | | |
|---|---|---|
| *G06F 3/043* | (2006.01) | |
| *G06F 3/041* | (2006.01) | |
| *G06F 3/01* | (2006.01) | |
| *G06F 1/16* | (2006.01) | |

(52) U.S. Cl.
CPC .............. *G06F 3/015* (2013.01); *G06F 1/163* (2013.01); *G06F 1/1694* (2013.01); *G06F 3/014* (2013.01); *G06F 3/017* (2013.01)

(58) Field of Classification Search
CPC ..... G04G 21/04; G06F 3/0346; G06F 3/0414; G06F 3/043; G06F 3/044; G06F 3/046; G06F 3/04883; G06F 2203/04101
USPC ................................................... 345/156–184
See application file for complete search history.

(56) References Cited

U.S. PATENT DOCUMENTS

| | | | |
|---|---|---|---|
| 8,624,836 B1 | 1/2014 | Miller et al. | |
| 2010/0289740 A1* | 11/2010 | Kim ................. | G04G 21/04 345/157 |
| 2011/0133934 A1* | 6/2011 | Tan ................... | G06F 1/163 340/573.1 |

(Continued)

FOREIGN PATENT DOCUMENTS

| | | |
|---|---|---|
| JP | 2012-108857 A | 6/2012 |
| KR | 10-2009-0061179 A | 6/2009 |

(Continued)

OTHER PUBLICATIONS

Korean Office Action dated Dec. 4, 2014 in counterpart Korean Patent Application No. 10-2014-0079600 (4 pages in English, 5 pages in Korean).

*Primary Examiner* — Nelson Rosario
(74) *Attorney, Agent, or Firm* — NSIP Law

(57) ABSTRACT

Provided are method and apparatus of defining at least a portion of a vicinity area of a portable device as an input area and controlling the portable device based on a user input provided on the input area, and the portable device enabling the method, wherein the portable device includes a sensing unit configured to sense a user input in a vicinity area of the portable device, a recognizer configured to recognize a user gesture corresponding to the user input, and an output unit configured to output a control instruction corresponding to the recognized user gesture to control the portable device.

29 Claims, 17 Drawing Sheets

(56) References Cited

U.S. PATENT DOCUMENTS

| | | | | |
|---|---|---|---|---|
| 2012/0249409 A1* | 10/2012 | Toney | ............... | G06F 3/017 |
| | | | | 345/156 |
| 2013/0053007 A1 | 2/2013 | Cosman et al. | | |
| 2014/0347295 A1* | 11/2014 | Kim | ............... | G06F 1/163 |
| | | | | 345/173 |
| 2015/0177836 A1* | 6/2015 | Ouchi | ............... | G06F 3/014 |
| | | | | 345/156 |
| 2015/0323998 A1* | 11/2015 | Kudekar | ............ | G06F 3/014 |
| | | | | 345/156 |

FOREIGN PATENT DOCUMENTS

| | | | |
|---|---|---|---|
| KR | 10-2010-0124113 A | 11/2010 | |
| KR | 10-2013-0101975 A | 9/2013 | |
| KR | 10-2014-0028656 A | 3/2014 | |

\* cited by examiner

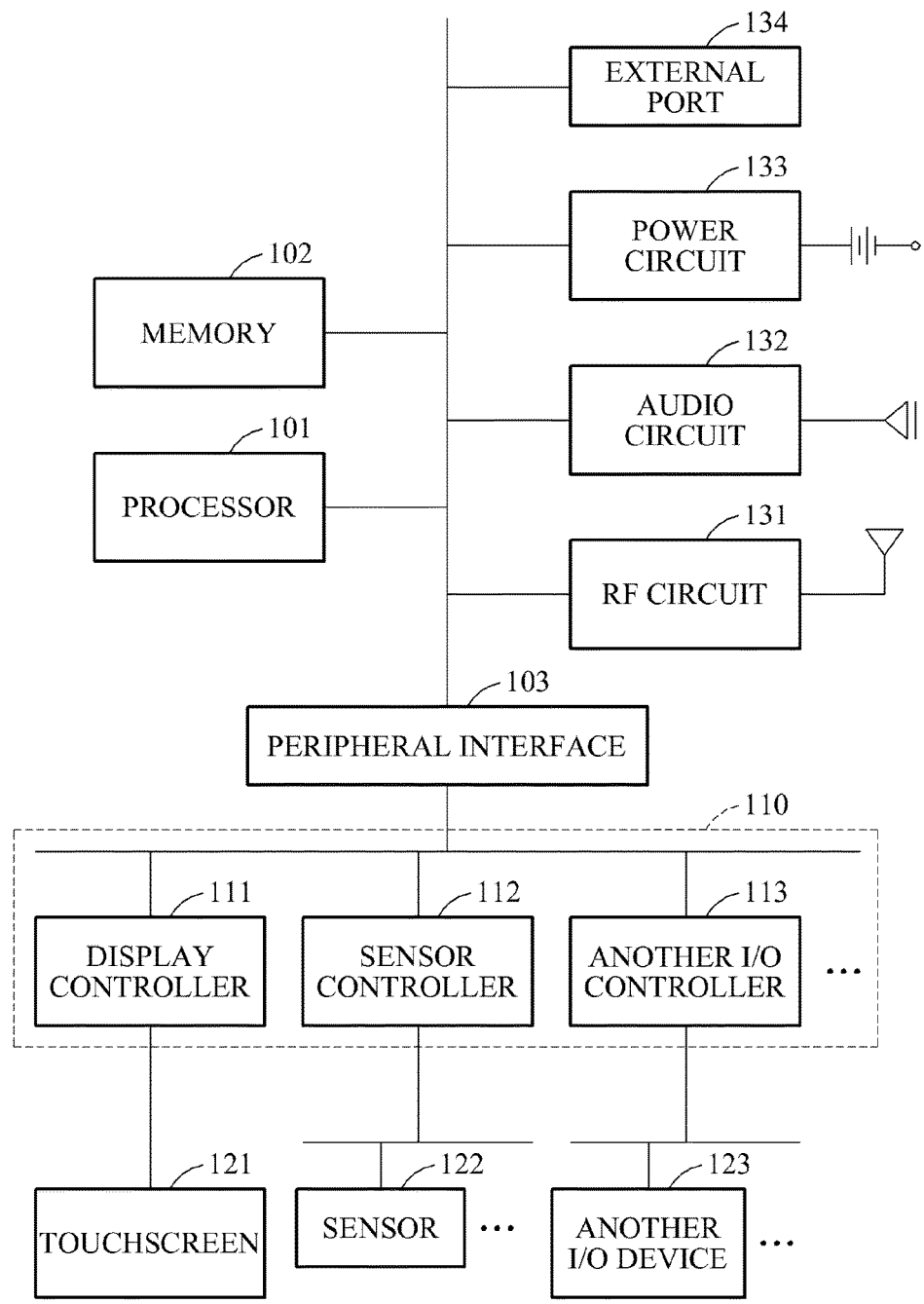

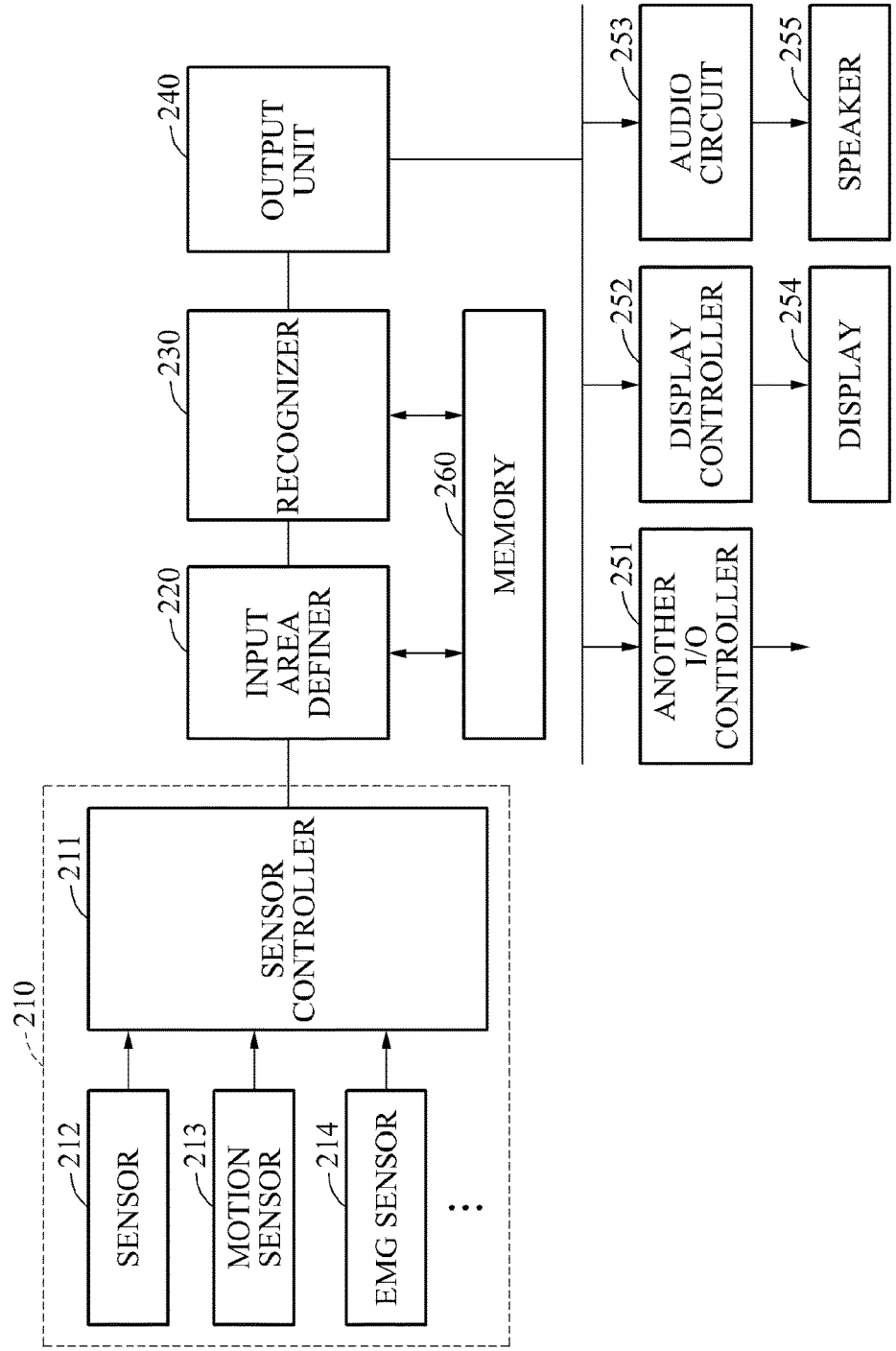

USER INPUT METHOD AND PORTABLE DEVICE

CROSS-REFERENCE TO RELATED APPLICATION(S)

This application claims the benefit under 35 USC 119(a) of Korean Patent Application No. 10-2014-0054324, filed on May 7, 2014, and Korean Patent Application No. 10-2014-0079600, filed on Jun. 27, 2014, in the Korean Intellectual Property Office, the entire disclosure these applications are incorporated herein by reference for all purposes.

BACKGROUND

1. Field

The following description relates to a user input method of a portable device, and to a method and apparatus of defining a vicinity area of a portable device as an on-body input area and controlling the portable device based on a user input provided in the on-body input area.

2. Description of Related Art

A user touches a touchscreen of a portable device with a hand to provide a user input to the portable device. In a case of a capacitive touchscreen, an accuracy of a touch input may increase as an area of a finger touching the touchscreen increases. A touch may be recognized based on a change in a capacitance when skin is in contact with the touchscreen. Thus, when the user wears gloves, a touch may not be recognized, and an input may restricted depending on conditions, for example, due to the presence of moisture on a hand.

A resistive touchscreen is not used widely for portable devices, for example, wearable devices. When resistive touchscreen is used, a touch input may be provided when a pressure greater than a predetermined level is applied. Thus, it may be difficult to provide a user input using a small touchscreen of a portable device.

A wearable device provided in a form of a watch or a band that is to be worn on a wrist has a small touchscreen. Thus, a user may experience difficulty in providing an input through the touchscreen. When touching the small touchscreen of the wearable device with a finger, a portion of the touchscreen may be obscured. It may be difficult to display a menu icon on the touchscreen, which is sufficiently large to be touched with a hand. Due to a characteristic of a wearable device, for example, a limitation on a size of the touchscreen, it may be difficult to display a number of menu icons that are large enough to provide a user input on a single touchscreen. Due to a characteristic of a capacitive touchscreen, an input may be provided when a finger sufficiently touches the touchscreen. Thus, provision of an accurate touch with a finger on the small touchscreen may be difficult. Although a resistive touchscreen is applied to wearable devices, a touch input may be provided by pressing the touchscreen with a pressure greater than a predetermined level. Thus, provision of an input with a finger through the small touchscreen may also be difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system including a portable device including a sensing unit configured to sense a user input in a vicinity area of the portable device, a recognizer configured to recognize a user gesture corresponding to the user input, and an output unit configured to output a control instruction corresponding to the recognized user gesture to control the portable device.

The portable device may further include a memory configured to record at least one predefined user gesture and the control instruction corresponding to the recognized user gesture, and the output unit may be configured to read and to output the control instruction corresponding to the user gesture from the memory.

The sensing unit may be configured to operate in response to a triggering event input from a user.

The portable device may further include an input area definer configured to define an on-body input area within the vicinity area of the portable device.

The input area definer may be further configured to divide the on-body input area into a number of cells, and the recognizer may be further configured to recognize the user gesture based on cells in which the user input is sensed.

The cells may be divided based on curves of knuckles.

The recognizer may be further configured to recognize a trajectory of the user input passing through the plurality of cells.

The on-body input area may be divided into one of 2×2 cells, 3×3 cells, 1×2 cells, 2×1, 1×7 cells, and 3×4 cells.

The input area definer may be further configured to modify the on-body input area based on a motion factor of the user.

The motion factor may indicate a state in which a wrist of the user is bent toward the portable device, and the input area definer may be further configured to extend the on-body input area to be greater than a default area.

The motion factor may indicate a state in which a wrist of the user is bent away from the portable device, and the input area definer may be further configured to reduce the on-body input area to be smaller than a default area.

The recognizer of the portable device may include an object recognizer configured to recognize an object used to perform the user input in the on-body input area.

The sensing unit may comprise at least one sensor and the at least one sensor may include at least one of an infrared (IR) sensor, an ultrasonic sensor, an acoustic sensor, a dynamic vision sensor (DVS), a linear sensor, an image sensor, a reticular sensor, and a three-dimensional (3D) sensor, or a combination thereof with a lens.

The sensing unit may further include a motion sensor configured to sense a motion of the portable device.

The motion sensor may correspond to an acceleration sensor, and the triggering event may correspond to a motion of the portable device.

The sensing unit may further include an electromyography (EMG) sensor, and the triggering event may correspond to a predetermined EMG signal value of the user.

In another general aspect, there is also provided a portable device including a sensing unit configured to sense a user input in an on-body input area in a vicinity of the portable device, through at least one sensor, a recognizer configured to recognize a user gesture corresponding to the user input, a communication unit configured to perform short-range communication with at least one external device, and an output unit configured to output a control instruction corresponding to the user gesture to control the external device.

The external device may include a television (TV).

The short-range communication may include one of Bluetooth or Wireless-Fidelity (Wi-Fi).

The user input may include an input of disposing an object to be used to perform the user input on or above the vicinity area, and the output unit may be configured to additionally output at least one candidate user gesture.

The output unit may be configured to output the candidate user gesture through one of a visual feedback, an auditory feedback, or a tactile feedback.

The portable device may be a wearable device.

The at least one sensor may be disposed in a band of the wearable device.

In still another general aspect, there is also provided a portable device including a sensing unit including at least one sensor, a memory configured to record a program to control the portable device or at least one external device connected to the portable device using short-range communication based on a user input provided through an on-body input area of a vicinity of the portable device, and at least one processor configured to execute the program. The program may be configured to sense a user input in the on-body input area using the sensing unit, recognize a user gesture corresponding to the user input, and output a control instruction corresponding to the user gesture.

Other features and aspects will be apparent from the following detailed description, the drawings, and the claims.

BRIEF DESCRIPTION OF THE DRAWINGS

FIG. 1 is a diagram illustrating an example of a portable device including a touchscreen.

FIG. 2 is a diagram illustrating an example of a wearable device.

Figure 3A:
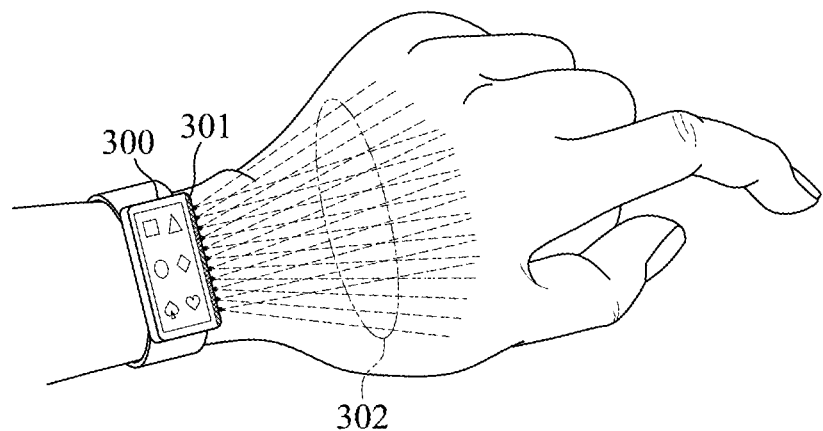
FIGS. 3A through 3D illustrate examples of a wearable device on which a user input method is depicted and an on-body input area is defined in a vicinity of the wearable device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A computer system is used as a reference to explain examples. The skilled in the art may fully understand that the system and methods as described below are applicable to any display system including a user interface (UI).

The terms "exemplary embodiment", "example", "aspect", and "exemplification" used herein shall not be construed that the discretionary aspect or design explained herein are better or more advantageous than other aspects or designs.

The terms "component", "module", "system", and "interface" used hereinafter means a computer-related entity in general, and may mean hardware, a combination of hardware and/or software.

The term "or" means an 'inclusive or' rather than "exclusive or". That is, unless otherwise stated or explicit in the context, the expression "x uses a or b" means one of natural inclusive permutations.

The singular form "a" or an" used herein should be interpreted as including "one or more" unless otherwise stated or explicit in the context regarding the singular type.

The term "and/or" used herein should be understood as referring to and including all of available combinations of at least one item of listed, relevant items.

The term "include" and/or "including" means that characteristics, steps, operations, modules, elements, and/or components exist, but does not exclude that one or more of other characteristics, steps, operations, modules, elements, and component, and/or a group thereof exist or are added.

Hereinafter, examples of a portable device will be described. In an example, the portable device, a UI for the portable device, and a relevant process for using the portable device will be described. Such a portable device may include a device that includes other functions such as, for example, a personal digital assistant (PDA) function, a music playing function, or a calling function. However, all or a portion of the portable device, the UI, and the relevant process which will be described below are applicable to general digital devices, for example, a smartphone, a tablet computer, a phablet computer, a personal computer (PC), a laptop computer, and a digital television (TV).

The portable device may support at least one of various applications, such as, for example, a telephone application, a video conference application, an e-mail application, an instant messaging application, a blogging application, a photo managing application, a digital camera application, a digital video camera application, a web browsing application, a digital music playing application, and a digital video playing application.

The various applications may use, for example, a physical or virtual UI. For example, a user may change or move information displayed on a touchscreen within each application or from one application to another application through the physical or the virtual UI. The portable device may support various applications using a physical or virtual UI that is intuitive and clear and uses a common physical or virtual architecture.

FIG. 1 is a diagram illustrating an example of a portable device including a touchscreen. Referring to FIG. 1, the portable device includes at least one processor 101, a memory 102, a peripheral interface 103, an input/output (I/O) subsystem 110, a touchscreen 121, a sensor 122, another I/O device 123, a radio frequency (RF) circuit 131, an audio circuit 132, a power circuit 133, and an external port 134. Such components may communicate with each other through at least one communication bus or signal line.

FIG. 1 illustrates an example of the portable device, and the portable device may have a configuration or arrangement including more or fewer components than illustrated, combining at least two components, or including different components. The components shown in FIG. 1 may be implemented using hardware including an integrated circuit specialized in at least one signal processing or application, software, or a combination of hardware and software.

The memory 102 may include, for example, a high-speed random access memory, a magnetic disk, a static random-access memory (SRAM), a dynamic random-access memory (DRAM), a read-only memory (ROM), a flash memory, or a non-volatile memory. The memory 102 may include a software module, an instruction set, or other various data necessary for an operation of the portable device. An access to the memory 102 by other components, for example, the processor 101 and the peripheral interface 103, may be controlled by the processor 101.

The peripheral interface 103 may combine the I/O subsystem 110 of the portable device with the at least one processor 101 and the memory 102. The processor 101 may perform various functions for the portable device and process data by executing the software module or the instruction set stored in the memory 102.

The RF circuit 131 may transmit and receive an RF signal, which is also known as an electromagnetic signal. The RF circuit 131 may convert an electric signal into an electromagnetic signal, or convert an electromagnetic signal into an electric signal. The RF circuit 131 may communicate with a communication network or other communication devices through an electromagnetic signal. The RF circuit 131 may include a known circuit to perform the foregoing function. The known circuit may include, but is not limited to, an antenna system, an RF transceiver, at least one amplifier, a tuner, at least one oscillator, a digital signal processor, a codec chipset, a subscriber identification module (SIM) card, and a memory. The RF circuit 131 may perform wireless communication with a cellular phone network, a wireless network such as a wireless local area network (LAN) and/or a metropolitan area network (MAN), a network such as an intranet, the Internet, the World Wide Web (WWW), and other devices. Such wireless communication may include an electronic mail protocol, for example, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (Wi-Fi) for Institute of Electrical and Electronics Engineers (IEEE) 802.11a/b/g/n/ac/ad/af/hew, Voice over Internet Protocol (VoIP), Worldwide Interoperability for Microwave Access (Wi-MAX), Long Term Evolution (LTE), Long Term Evolution-Advanced (LTE-A), Internet Message Access Protocol (IMAP), and/or Post Office Protocol (POP), an instant messaging protocol, for example, eXtensible Messaging and Presence Protocol (XMPP), Session Initiation Protocol for Instant Messaging and Presence Leveraging Extensions (SIMPLE), Instant Messaging and Presence Service (IMPS), or Short Message Service (SMS), or other communication protocols known to those skilled in the art. In addition to wireless communication protocols described above, other communication standards, protocols, and technology are considered to be well within the scope of the present disclosure.

The audio circuit 132 may provide an audio interface between a user and the portable device using a speaker and/or a microphone. The audio circuit 132 may receive audio data from the peripheral interface 103, convert the audio data into an electric signal, and transmit the electric signal to the speaker. The speaker may convert the electric signal into an audible sound wave. The audio circuit 132 may receive an electric signal converted from a sound wave by the microphone. The audio circuit 132 may convert an electric signal into audio data, and transmit the audio data to the peripheral interface 103 to process the audio data. The audio data may be searched from or transmitted to the memory 102 or the RF circuit 131 by the peripheral interface 103. The audio circuit 132 may further include a headset jack. The headset jack may provide an interface between the audio circuit 132 and a portable audio I/O peripheral device, for example, an output-exclusive headphone or a headset including input and output devices.

The power circuit 133 may be connected to a battery to supply power to power all or a portion of the components of the portable device. For example, the power circuit 133 may include a power management system, at least one power source, for example, a battery or an alternating current (AC) power source, a charging system, a power failure detection circuit, a power converter or inverter, a power indicator, and any other components for power generation, management, and distribution of a portable device.

The I/O subsystem 110 may combine an I/O peripheral device, for example, the touchscreen 121, the sensor 122, or the other input/output device 123, with the peripheral interface 103. The I/O subsystem 110 includes a display controller 111, a sensor controller 112, and at least one another I/O controller 113. The touchscreen 121, the sensor 122, or the other input/output device 123 may be combined directly with the peripheral interface 103, and not through the I/O subsystem 110.

At least one of the processor 101, the peripheral interface 103, and the I/O subsystem 110 may be provided on a single chip. In another example, a portion of at least one of the processor 101, the peripheral interface 103, and the I/O subsystem 110 may be provided on a single chip.

The display controller 111 may receive an electric signal from the touchscreen 121 including a touch-detection area, transmit an electric signal to the touchscreen 121, or perform both the transmission and the reception. By controlling of the display controller 111, the touchscreen 121 may display visual outputs for a user. The visual outputs may include a graphic, a text, an icon, a video, and any combination thereof (collectively referred to as the "graphics"). All or a portion of the visual outputs may correspond to a UI which will be described later in detail.

The touchscreen 121 may include a liquid crystal display (LCD), a light emitting polymer display (LPD), an organic light emitting diode (OLED), an active-matrix organic light emitting diode (AMOLED), or other displays known to those skilled in the art. The touchscreen 121 and the display controller 111 may employ capacitive technology, resistive technology, infrared technology, and surface acoustic wave technology, but not limited thereto, and may further include other touch detection technologies known to those skilled in the art. The touchscreen 121 and the display controller 111 may detect a contact, a movement thereof, or a release thereof using a proximity sensor or other elements to determine at least one contact point with the touchscreen 121.

The display controller 111 may be combined with a screen not including a touch-detection area. The screen not including the touch-detection area may receive an electric signal from the display controller 111 and display a visual output for a user. The screen not including the touch-detection area may include a plasma display panel (PDP), an electronic paper display (EPD), an LCD, an LPD, an OLED, an AMOLED, and other displays. The portable device using the screen not including the touch-detection area may provide an I/O device, for example, a physical keyboard, a mouse, and a physical button, as a UI.

The at least one another I/O controller 113 may receive an electric signal from the other input/output device 123, or transmit an electric signal to the other input/output device 123. The other input/output device 123 may include, for example, a button, a keyboard, a touch pad, a dial, a slider switch, a pen, and a joy stick. The pen may include, for example, a stylus pen, and a digital pen. The other I/O controller 113 may be combined with any pointer device, for example, an infrared port, a universal serial bus (USB) port, and a mouse.

The other input/output device 123 may include at least one physical or virtual button. In a case of the virtual button, the button and a button controller may correspond to a portion of the touchscreen 121 and the display controller 111, respectively. The button may include an up/down button to control a volume of the speaker or the microphone, a locker button, or a push button. For example, when a user presses the push button for a short time, the touchscreen 121 may be unlocked and a process of unlocking the portable device may be initiated by applying a gesture to the touchscreen 121. The user may press the push button for a long time to turn on or turn off the portable device.

The other input/output device 123 may include at least one physical keyboard or virtual soft keyboard. As an example of the keyboard, symbols of QWERTY and/or non-QWERTY may be used. In the virtual soft keyboard, the soft keyboard and a soft keyboard controller may correspond to a portion of the touchscreen 121 and the display controller 111, respectively. The soft keyboard may include a fewer number of graphics (or soft keys) than the physical keyboard. Thus, the user may select at least one graphic of the soft keyboard, and display at least one corresponding symbol on the touchscreen 121.

The other input/output device 123 may include a touch pad to activate or deactivate a predetermined function. The touch pad may include a touch-detection area, which may not display visual outputs, unlike the touchscreen 121. The touch pad may correspond to a touch-detection surface separated from the touchscreen 121, or a portion of the touch-detection surface formed and extended by the touchscreen 121.

The sensor 122 may include various types of sensors, such as, for example, an optical sensor, a proximity sensor, an acceleration sensor, a global positioning system (GPS) sensor, a magnetic sensor, a tilt sensor, an environment sensor, a weather sensor, an electromyography (EMG) sensor, or a motion sensor.

FIG. 2 is a diagram illustrating an example of a wearable device. Referring to FIG. 2, the wearable device includes a sensing unit 210, an input area definer 220, a recognizer 230, an output unit 240, and a memory 260.

The sensing unit 210 includes sensors, for example, a sensor 212, a motion sensor 213, and an EMG sensor 214, and a sensor controller 211 connected to the sensors to perform signal processing on a sensed user input and to control the sensors. The signal processing may include noise filtering for signals received from the sensors. The sensor 212 may include at least one distance/proximity sensor, or be implemented using a line type sensor. The sensor 212 may be designed in a multilayer structure. When the sensor 212 is designed in a multilayer structure, the sensor 212 may sense a two-dimensional (2D) location on x and y axes, and a three-dimensional (3D) location on x, y, and z axes. The EMG sensor 214 may be disposed physically apart from the sensor 212. The EMG sensor 214 may be included in the wearable device at an optimal location to detect an EMG signal of a user.

The sensor 212 may include at least one ultrasonic sensor. To estimate a location of an object, for example, a finger, through the at least one ultrasonic sensor, the sensor 212 may measure distance or depth using triangulation of a pulse arrival time by transmitting and receiving a pulse of an ultrasonic wave. When the ultrasonic sensor is used, the sensor 212 may be implemented using low power, and may not be affected by a lighting environment, for example, sunlight. In addition, an acoustic sensor may be used as an example of the ultrasonic sensor. The acoustic sensor may sense an oscillation or a sound produced by a user input of tapping in an on-body input area, which will be described later.

The sensor 212 may include a 3D sensor. The 3D sensor may correspond to an array provided in a form of a line. When the 3D sensor is used, the sensor 212 may achieve a high-resolution location accuracy (x, y, z) in an on-body input area corresponding to a vicinity area of the wearable device, for example, a back of a hand. Thus, the sensor 212 may be utilized for precise pattern recognition, such as, for example, character recognition.

The sensor 212 may include at least one dynamic vision sensor (DVS). When the DVS is used, the sensor 212 may operate using ultra low power and thus, remain in an always-on state to sense a quick motion.

The sensor 212 may include at least one infrared (IR) sensor. In a case of using the IR sensor, when a signal is transmitted from the IR sensor, the sensor 212 may calculate a location of an object by measuring a change in intensity of light reflected by the object, and detect a 2D location of the object in an on-body input area corresponding to a vicinity area of the wearable device. In addition to the IR sensor, an IR image sensor, a combination of an IR sensor and a lens, a combination of an IR sensor and a wide-angle lens, a combination of an IR proximity sensor and a light emitting diode (LED) array, or an IR time of flight (ToF) sensor may be used.

The sensor 212 may be implemented using at least one of a combination of a linear sensor and a lens, an image sensor, and a reticular sensor.

The foregoing examples are described based on a wearable device worn on a wrist. However, the wearable device may be worn on an arm using an arm band. In this example, a user input in the on-body input area corresponding to the vicinity area of the wearable device may be detected on an arm, in addition to a back of a hand of a user.

The wearable device may be worn on a wrist. The sensing unit 210 includes the EMG sensor 214 configured to sense a motion of the wrist. A change in an EMG signal of a wrist of a user may be detected using the EMG sensor 214. Based on the change in the EMG signal, a user input mode of the wearable device may be triggered and an on-body input area in which the user input mode of the wearable device is to be performed may be set, which will be described further with reference to FIGS. 10A through 11B.

The input area definer 220 may define an on-body input area in response to a performance of an on-body input mode of the wearable device. The on-body input mode may be performed based on a predetermined triggering event. The triggering event to perform the on-body input mode may include, but is not limited to, the following events:

(1) Event in which a predetermined user gesture is input in an on-body input area corresponding to a vicinity area of the wearable device.

(2) Event in which a predetermined user gesture is input on a touchscreen of the wearable device.

(3) Event in which a motion of a finger or a back of a hand on which the wearable device is worn is detected.

(4) Event in which a predetermined EMG signal of a user is detected by an EMG sensor.

(5) Event in which a physical displacement of a wearable device is detected through a physically-combined structure included in the wearable device.

The aforementioned triggering events will be described further with reference to FIGS. 10A through 10D.

The input area definer 220 may define the on-body input area based on a location of the sensing unit 210 of the wearable device. Examples of a method of defining the on-body input area will be described with reference to FIGS. 3A through 6B.

FIGS. 3A through 6B illustrate examples of a wearable device on which a user input method is depicted and an on-body input area is defined in a vicinity of the wearable device. FIGS. 3A through 6B illustrate a wearable device including a sensor provided in a form of a line for ease of description. However, the sensor may also be implemented using a sensor provided in a form of a dot.

FIGS. 3A through 3D illustrate examples of a wearable device on which a user input method is depicted and an on-body input area defined in a vicinity of the wearable device. Referring to FIGS. 3A through 3D, at least one sensor configured to sense a distance or a degree of proximity may be provided on a side surface of the wearable device worn on a wrist. A 2D location between the wearable device and an object may be verified based on coordinate (x, y, and/or z axis) information from each sensor included in the sensor. When sensors are arranged in a form of at least two layers, a 3D location immediately before the object touches a back of a hand may be verified by calculating all locations on x, y, and z axes. Using the method described above, through the sensor disposed on one side of the wearable device, a predetermined operation or instruction may be performed based on the sensed location, a predetermined gesture pattern may be recognized by sensing consecutive signals, an instruction mapped to the corresponding gesture may be executed, or letters written in the on-body input area may be recognized.

<Definition of On-Body Input Area>

FIG. 3A illustrates a wearable device 300, at least one sensor 301 included in the wearable device 300, and an on-body input area 302 corresponding to at least a portion of a vicinity area of the wearable device 300. The wearable device 300 corresponds to a rectangular wrist-wearable device. In this example, the on-body input area 302 in which a user input may be detected through the sensor 301 may be a back of hand area.

Figure 3B:
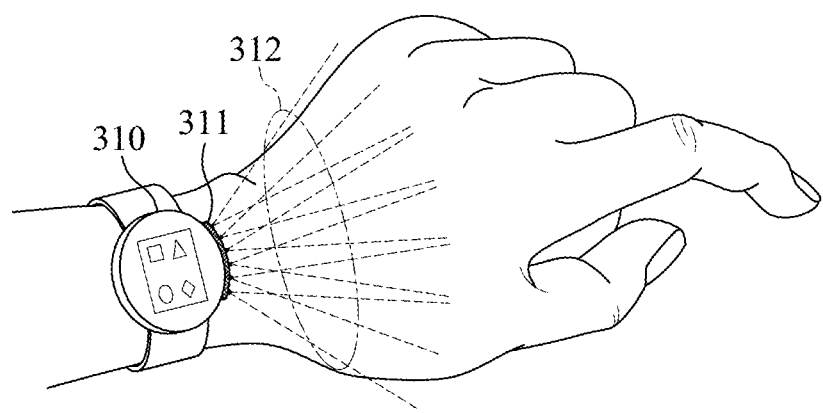

FIG. 3B illustrates a wearable device 310, at least one sensor 311 included in the wearable device 310, and an on-body input area 312 corresponding to at least a portion of a vicinity area of the wearable device 310. The wearable device 310 corresponds to a circular wrist-wearable device. In this example, the on-body input area 312 in which a user input may be detected through the sensor 311 may be a back of hand area.

Figure 3C:
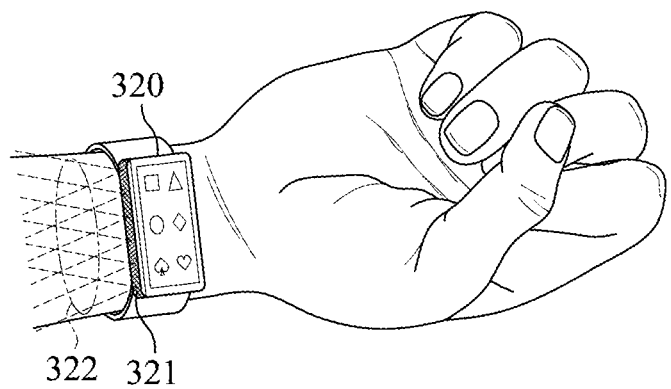

FIG. 3C illustrates a wearable device 320, at least one sensor 321 included in the wearable device 320, and an on-body input area 322 corresponding to at least a portion of a vicinity area of the wearable device 320. The wearable device 320 corresponds to a rectangular wrist-wearable device, and may be worn on an inside of a wrist. In this example, the on-body input area 322 in which a user input may be detected through the sensor 321 may be defined as an inner area of the wrist or a palm area. Whether a wearable device is placed on a back of a hand or an inside of a wrist may be determined using a motion sensor or a gyro sensor in addition to the sensor 321. An on-body input area may be adaptively defined as a back of hand area or an inside of a wrist/a palm area based on an orientation of the wearable device.

Figure 3D:
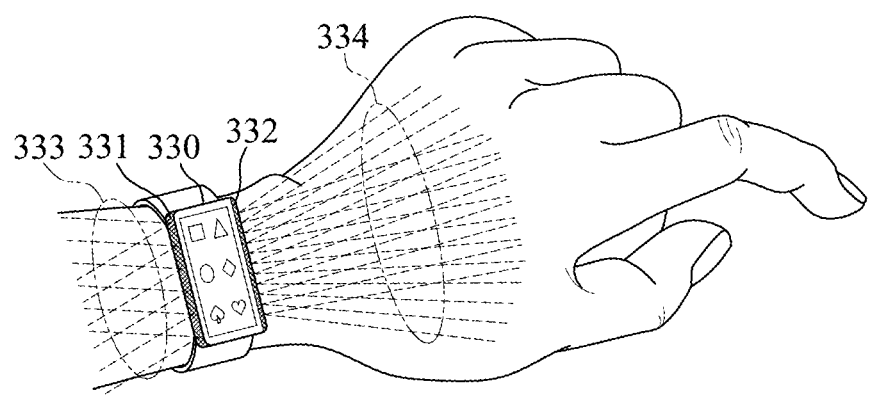

FIG. 3D illustrates a wearable device 330, sensors 331 and 332 included in the wearable device 330, and on-body input areas 333 and 334, each corresponding to at least a portion of a vicinity area of the wearable device 330. The wearable device 330 corresponds to a rectangular wrist-wearable device. The sensors 331 and 332 may be disposed on left and right side surfaces of the wearable device 330, respectively. In this example, each of the on-body input areas 333 and 334 in which a user input may be detected through the sensors 331 and 332 may be defined as one of an inner area of the wrist or a back of hand area. In a case in which the sensors 331 and 332 are attached to both side surfaces of the wearable device 330 as illustrated in FIG. 3D, an area in which an object is detected may be activated as an on-body input area.

<Method of Performing Shortcut in On-Body Input Area>

FIGS. 4A through 4E illustrate examples of dividing the on-body input area illustrated in FIGS. 3A through 3D into a plurality of cells to recognize a user input.

Figure 4A:
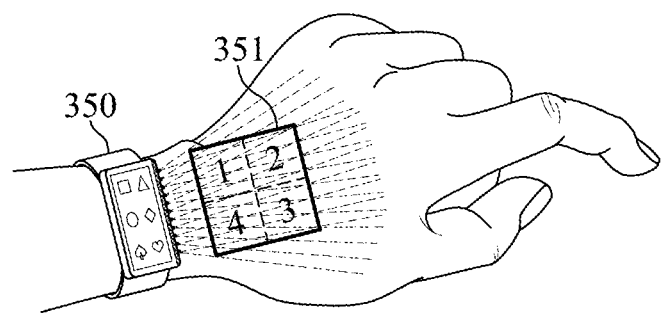
FIGS. 4A through 4E illustrate examples of a wearable device on which a user input method is depicted and an on-body input area is defined in a vicinity of the wearable device.

Referring to FIG. 4A, an on-body input area 351 defined in a vicinity of a wearable device 350 is divided into 2×2 cells. When the on-body input area 351 is divided into 2×2 cells and a user input is sensed in each cell area, a user gesture may be recognized based on each cell in which the user input is sensed. For example, when a user input is sensed in a cell 1, the wearable device 350 may activate a clock function. As another example, when a user input is sensed in a cell 2, the wearable device 350 may activate a function to measure a work rate of a user. In this way, user inputs provided in cells 1 through 4 may be recognized as user gestures to activate different functions of the wearable device 350. When a user input is sensed in each of the cells 1 through 4, a function mapped to each cell may be activated in the wearable device 350.

Figure 4B:
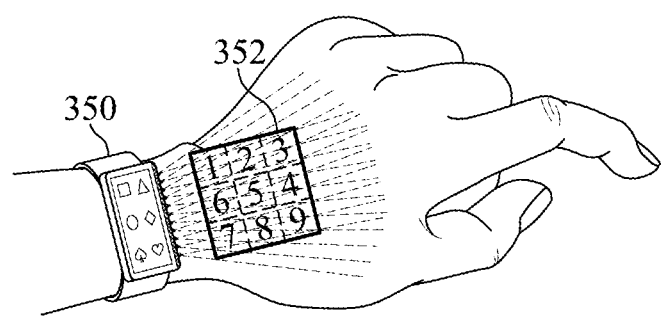
Figure 4C:
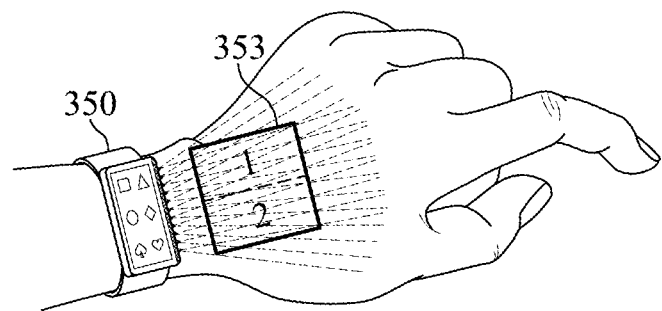
Figure 4D:
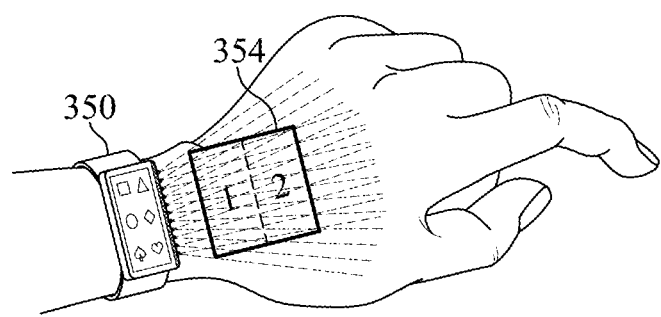

Referring FIG. 4B, an on-body input area 352 defined in a vicinity of the wearable device 350 is divided into 3×3 cells. Referring to FIG. 4C, an on-body input area 353 is divided into 1×2 cells. Referring to FIG. 4D, an on-body input area 354 is divided into 2×1 cells. Similar to the example of FIG. 4A, when a user input is sensed in each cell area, a user gesture may be recognized based on each cell in which the user input is sensed.

Figure 4E:
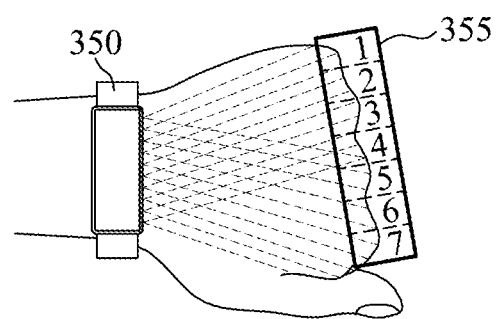

Referring FIG. 4E, a method of recognizing a user gesture using knuckle portions 355 of a user in an on-body input area of a wearable device 350 is illustrated. The knuckle portions 355 of the user may include a plurality of curves, for example, seven curves in FIG. 4E. Based on the curves of the knuckle portions 355, protruding portions and recessed portions may be divided as cells, respectively. When a user input is sensed in each divided cell area, the user gesture may be recognized based on each cell in which the user input is sensed.

<Method of Mapping Gesture in On-Body Input Area>

Figure 5A:
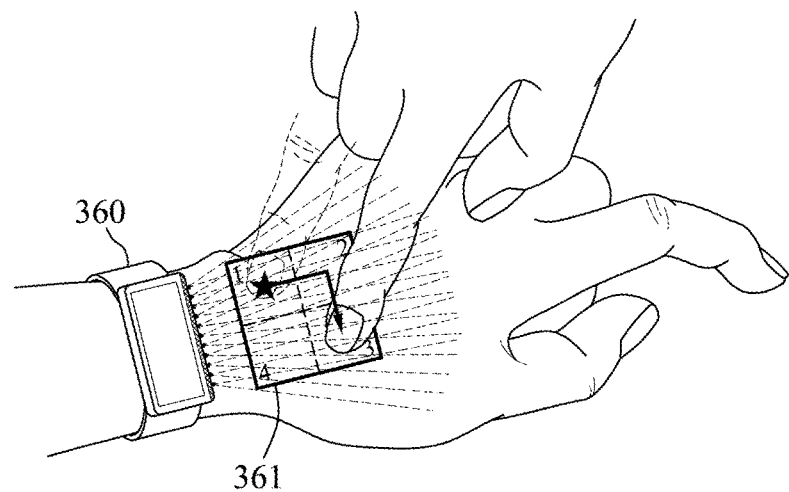
FIGS. 5A through 5B illustrate examples of a wearable device on which a user input method is depicted and an on-body input area is defined in a vicinity of the wearable device.
Figure 5B:
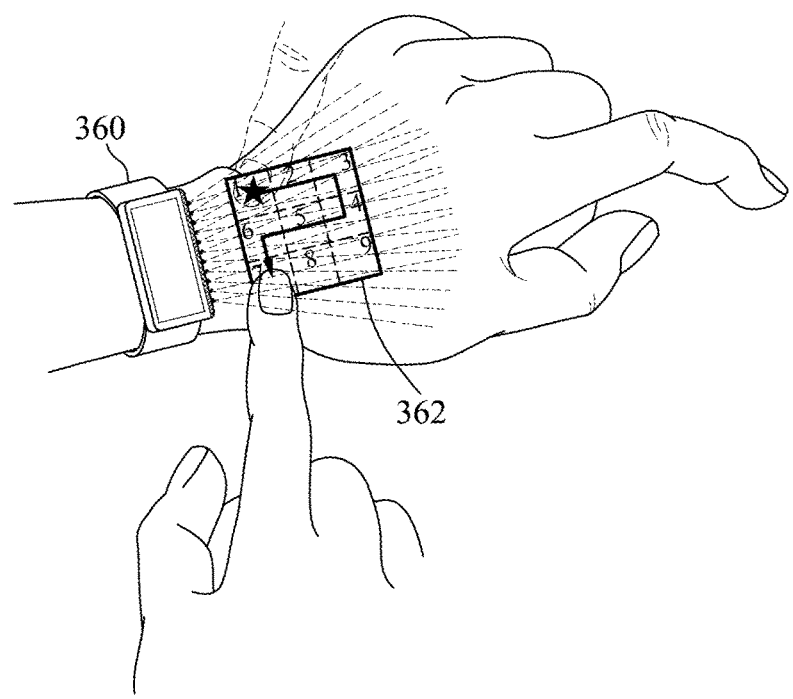

FIGS. 5A through 5B illustrate examples of dividing the on-body input area illustrated in FIGS. 3A through 3D into a plurality of cells to recognize a user input.

Referring to FIG. 5A, an on-body input area 361 corresponding to a portion of a vicinity area of a wearable device 360 is divided into four cells, and a user input is received. The on-body input area 361 is divided into the four cells, and a user may move an object, for example, a finger, from a cell 1 to a cell 3 via a cell 2. The wearable device 360 may detect a trajectory of the user input passing through cell 1 cell 2 cell 3, and recognize the trajectory as a user gesture. The wearable device 360 may perform a function corresponding to the user gesture. The wearable device 360 may prestore the function corresponding to the trajectory. The wearable device 360 may perform different functions corresponding to a number of cases of a trajectory passing through at least two of the cells 1 through 4.

Referring to FIG. 5B, an on-body input area 362 corresponding to a portion of a vicinity area of the wearable device 360 is divided into nine cells, and a user input is received. The on-body input area 362 is divided into the nine cells, and a user may move an object, for example, a finger, from a cell 1 to a cell 7 via cells 2, 3, 4, 5, and 6. The wearable device 360 may detect a trajectory of the user input passing through the cells 1 to 7, and recognize the trajectory as a user gesture. The wearable device 360 may perform a function corresponding to the user gesture. The wearable device 360 may prestore the function corresponding to the trajectory. The wearable device 360 may perform different functions corresponding to a number of cases of a trajectory passing through at least two of the cells 1 through 9. For example, the trajectory of the user input illustrated in FIG. 5B may be used as a user input to unlock the wearable device 360.

<Method of Dividing and Mapping Cells in On-Body Input Area and Wearable Device>

Figure 6A:
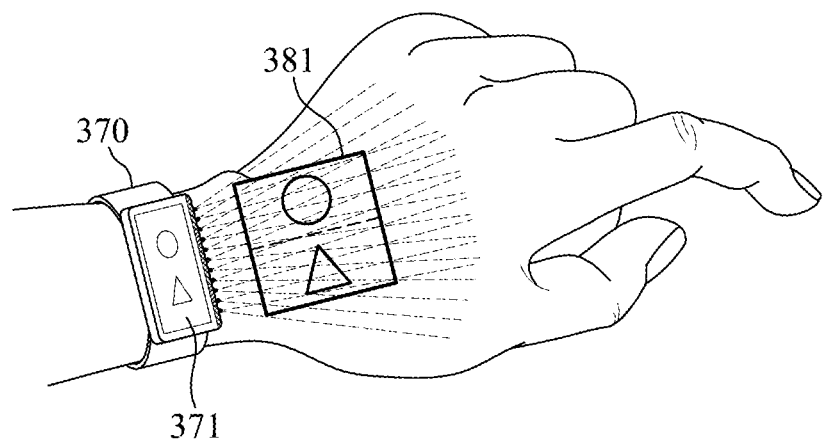
FIGS. 6A through 6B illustrate examples of a wearable device on which a user input method is depicted and an on-body input area is defined in a vicinity of the wearable device.
Figure 6B:
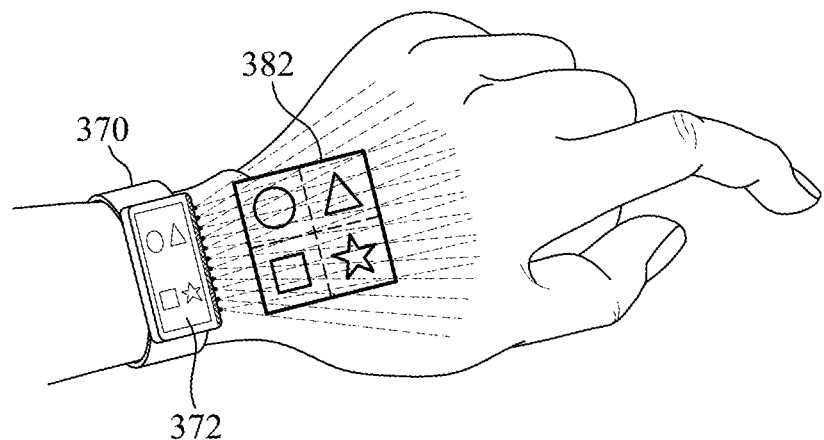

FIGS. 6A through 6B illustrates examples of dividing the on-body input area illustrated in FIGS. 3A through 3D into a plurality of cells to recognize a user input. In particular, FIGS. 6A through 6B illustrate examples of adaptively dividing the on-body input area into cells based on a number of selectable or executable items of content output through a display of a wearable device 370.

Referring to FIG. 6A, selectable or executable items of content may be output in a form of 1×2 through a display 371 of the wearable device 370. In this example, an on-body input area 381 may be divided into 1×2 cells corresponding to an arrangement of the items of content output through the display 371 of the wearable device 370. A user may perform a user input in one of the divided cells of the on-body input area 381, and the wearable device 370 may control an item of content corresponding to the cell to be selected or executed.

Referring to FIG. 6B, selectable or executable items of content may be output in a form of 2×2 through a display 372 of the wearable device 370. In this example, an on-body input area 382 may be divided into 2×2 cells corresponding to an arrangement of the items of content output through the display 372 of the wearable device 370. A user may perform a user input in one of the divided cells of the on-body input area 382, and the wearable device 370 may control an item of content corresponding to the cell to be selected or executed.

Through the method of dividing and mapping the cells in the on-body input area and the wearable device 370, a user input may be provided easier and more precisely although a size of the display 371 or 372 of the wearable device 370 is small or a size of content output through the display 371 or 372 is small.

Referring to FIG. 2, the input area definer 220 may perform signal processing to normalize a curve of the on-body input area, for example, the back of hand area or the inner area of the wrist of FIG. 3A. The input area definer 220 may sense a motion of a back of a hand to determine whether a motion of placing an object in a vicinity area of the wearable device is an intended manipulation. When a value of a signal detected by the sensing unit 210 is greater than a predetermined threshold, an on-body input mode may be activated. For example, when an object is sensed for a predetermined period of time in the on-body input area, such a motion may be determined to be an intended manipulation of a user, and a location calculation may be initiated. When a motion of a back of a hand is not sensed, such a motion may be determined to be an unintended manipulation and the on-body input mode may not be activated. A user may use a wearable device while a touchscreen of the wearable device is in an on state. In this example, when a motion of an object is detected by the sensing unit 210, the on-body input mode may be activated. As another example, when an object is detected on a back of a hand or an inner area of a wrist within a predetermined period of time although a motion of the back of the hand is absent, the on-body input mode may be activated.

The recognizer 230 may detect a location of an object to be used to perform a user input in an on-body input area, and recognize the user input as a predetermined gesture pattern by recognizing a direction in which the object is moved and by tracking the movement. The object used to perform a user input may correspond to objects that may perform a user input in an on-body input area, such as, for example, a finger or a pen. As another example, the object may correspond to a finger of a user or a joint of a finger that is bent. The recognizer 230 may verify a 2D or 3D location of the object in the on-body input area, for example, a back of a hand or an inner area of a wrist. When a 3D sensor is included in the sensing unit 210 of the wearable device, a 3D location of the object immediately before the object directly touches the on-body input area may be verified. In this example, the wearable device may operate in a hovering mode. When the wearable device operates in the hovering mode, the wearable device may display, in advance on a touchscreen, a candidate menu that may be input in an on-body input mode for the user.

The recognizer 230 may include an object recognizer (not shown) configured to recognize an object used to perform a user input in the on-body input area. The object recognizer may identify an object. The output unit 240 may control different functions to be performed with respect to identical user gestures depending on the identified object. For example, when the recognizer 230 detects user inputs of tapping at a predetermined location in the on-body input area, different functions may be performed with respect to the tapping inputs at an identical location based on types of objects identified by the object recognizer.

The recognizer 230 may recognize a gesture pattern, for example, a number, a character, and a figure input in the on-body input area by the user. The recognizer 230 may recognize a location, a direction, and a gesture pattern of an object input in the on-body input area. The recognizer 230 may calculate an angle of a motion of a back of a hand or a change in the motion of the back of the hand based on sensing results obtained by the EMG sensor 214 included in the sensing unit 210, thereby recognizing a user input to perform screen zoom-in/zoom-out, or screen brightness adjustment simply through a motion of bending the back of the hand upward and downward, or moving the back of the hand leftward and rightward although a physical input is absent in the on-body input area.

The output unit 240 may generate a control instruction to control the wearable device based on results recognized by the recognizer 230, and transmit the generated control instruction to another I/O controller 251, a display controller 252, and an audio circuit 253. Based on the transmitted control instruction, a display 254 or a speaker 255 may operate. Through such a control instruction, the wearable device and objects included in content displayed on the wearable device may be manipulated, and output values of screen information, audio information, for example, a sound or a voice, and haptic information, for example, an oscillation, of the wearable device may be controlled. Some examples of the control instruction to be generated by the output unit 240 may be as follows.

(1) Menu manipulation: An on-body input area may be divided into cells, such as, for example, 2×2 cells, 3×3 cells, 1×2 cells, 2×1 or 3×4 cells based on a display menu arrangement, and a selection through a tap motion and an operation execution through a flip may be enabled in the on-body input area. When the on-body input area corresponds to a back of a hand, the on-body input area may be divided into 1 to 50 cells in an x-axial direction and 1 to 50 cells in a y-axial direction based on the back of the hand.

(2) Zoom-in/zoom-out: Content currently being displayed on the wearable device may be zoomed in or zoomed out based on an angle of a motion of a back of a hand, a change in the motion of the back of the hand, rubbing motion on the back of the hand or pinching motion on the back of the hand.

(3) Gesture recognition: By recognizing a predetermined gesture, a frequent function or a function defined by a user may be performed, or a frequent application or an application defined by the user may be executed.

(4) Number/character recognition: When a first number/character is written with an object, for example, a finger, contact information, an application, or a menu starting with the corresponding number/character may be visually or audibly displayed. The user may make selection from the menu.

(5) Figure drawing/handwriting: By tracking a motion of an object, for example, a finger, in an on-body input area, a corresponding figure or character may be drawn.

(6) Screen brightness adjustment: A brightness of a screen may be adjusted based on a motion of a back of a hand. The brightness may be adjusted by inputting a gesture of moving upward, downward, leftward, and rightward in an on-body input area.

(7) Volume adjustment: A volume may be adjusted based on a motion of a back of a hand. The volume may be adjusted through a gesture of moving upward, downward, leftward, and rightward in an on-body input area.

(8) Call answering/declining: A call may be answered or declined based on a motion of a back of a hand. When a phone rings, the call may be answered or declined through a predetermined gesture or a simple flip motion in an on-body input area.

(9) Text message reception/deletion: By inputting a gesture in an on-body input area, a text message may be received and deleted.

(10) Content transmission: When a wearable device is connected to a smartphone through wireless communication, content, for example, a picture, a video, and a voice message may be transmitted from the wearable device to the smartphone by inputting a predetermined gesture in an on-body input area.

(11) Oscillation mode/pattern change: An oscillation mode and an oscillation pattern may be changed through a gesture input in an on-body input area or a motion of a back of a hand.

(12) Hovering: A function, for example, a preview of a menu selectable through an on-body input mode may be provided when an object, for example, a finger, is placed immediately above an on-body input area.

The memory 260 may record a program to perform a user input method of the wearable device. The memory 260 may record an execution instruction code corresponding to the user gesture recognized by the recognizer 230. The output unit 240 may read an execution instruction code stored in the memory 260 based on the user gesture recognized by the recognizer 230, and generate a control instruction based on the read execution instruction code.

Figure 7:
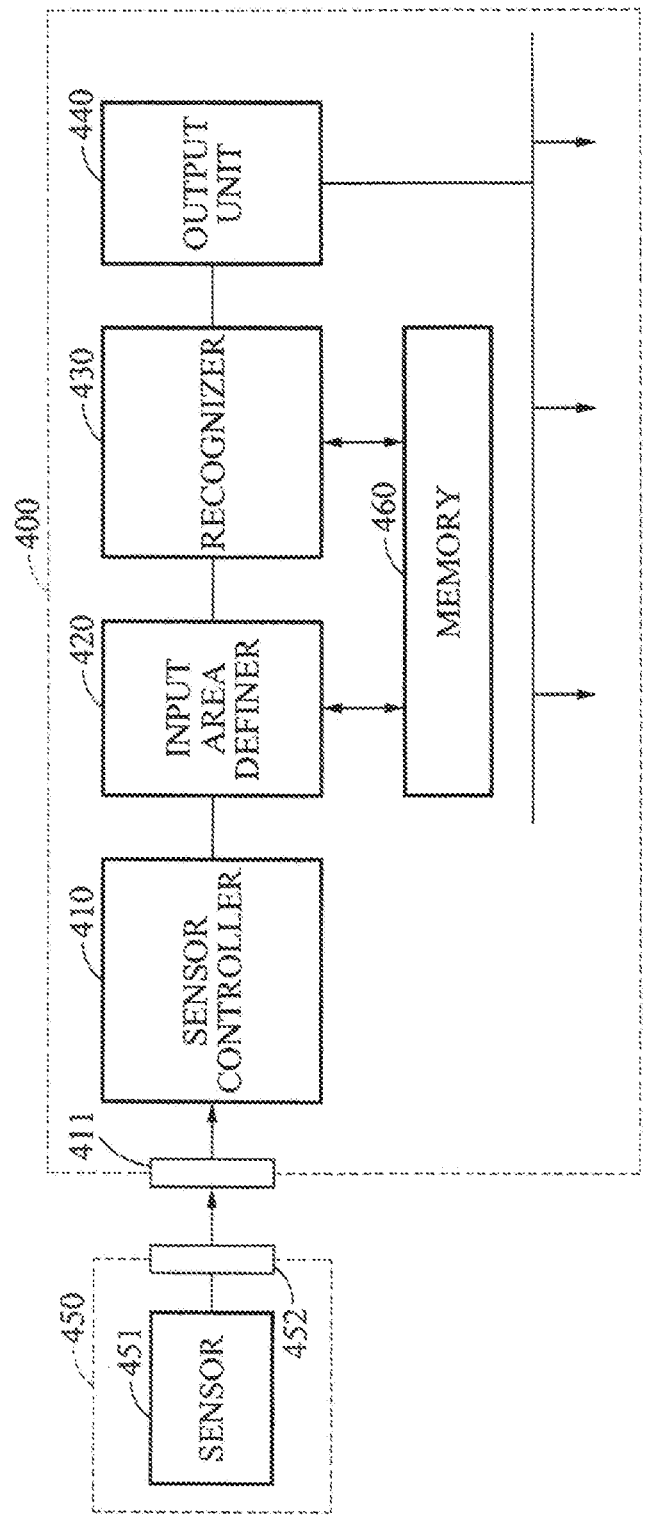
FIG. 7 is a diagram illustrating an example of a wearable device.

FIG. 7 is a diagram illustrating an example of a wearable device 400.

FIG. 7 illustrates an example in which a sensing unit 450 including at least one sensor 451, which is included in an arm band or a wrist band fastened to the wearable device 400. The sensing unit 450 may be disposed in an external device to be fastened to the wearable device 400, similar to the arm band or the wrist band. The at least one sensor 451 may be connected to the wearable device 400 through wired/wireless interfaces 452 and 411.

Referring to FIG. 7, the wearable device 400 includes a sensor controller 410 connected to the sensing unit 450, an input area definer 420, a recognizer 430, an output unit 440, and a memory 460. Each component module of the wearable device 400 may perform a function similar to a function of each component module of the wearable device of FIG. 2 and thus, duplicated descriptions will be omitted for conciseness.

FIG. 7 illustrates an example of an arm band or a wrist band, but is not limited thereto. The at least one sensor 451 may be disposed on a fastening portion of the wrist band, a wrist strap, and the fastening portion may be practiced independently from the wrist band. The at least one sensor 451 may be disposed on one side of a protector configured to protect a main body of the wearable device 400.

Figure 8A:
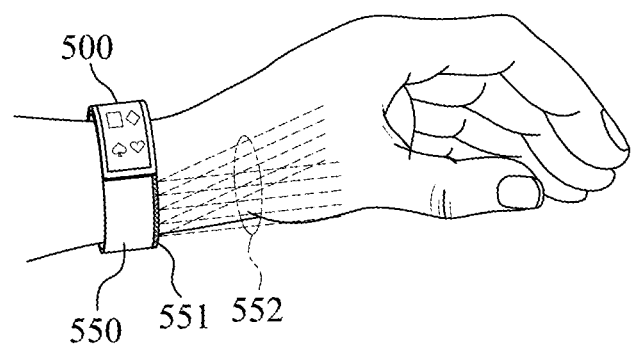
FIGS. 8A through 8B illustrate examples of a wearable device on which a user input method is depicted.
Figure 8B:
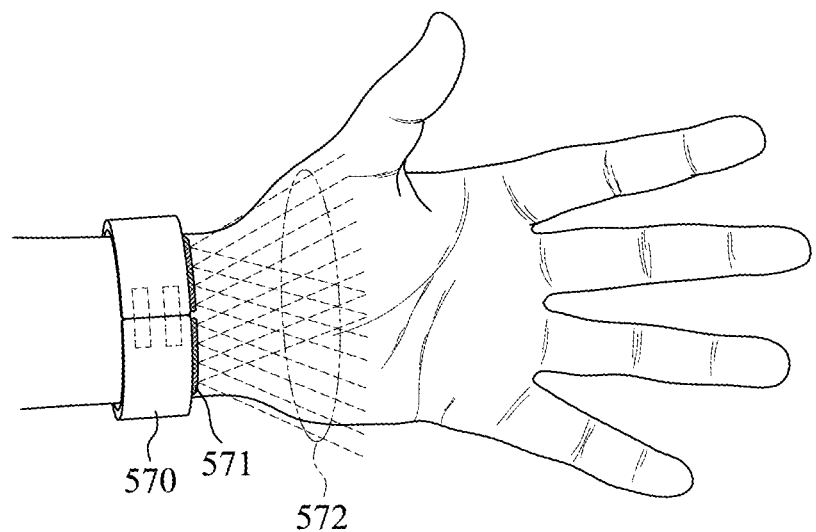

Examples of the sensing unit 450 and the wearable device 400 of FIG. 4 will be described in detail with reference to FIGS. 8A through 8B. FIGS. 8A through 8B illustrate examples of a wearable device on which a user input method is depicted.

Referring to FIG. 8A, a wearable device 500 is worn on a wrist of a user while being fastened to a wrist band 550. At least one sensor 551 is included on one side of the wrist band 550. An on-body input area 552 may be defined as one side of a back of a hand of the user. The wrist band 550 may correspond to a circular band provided to cover a lower portion of the wearable device 500. In this example, the at least one sensor 551 may be included on one side of the wrist band and may be 550 disposed on a bottom of the wearable device 500. The wearable device 500 may operate similar to an example in which a sensor is disposed on one side of a wearable device.

Referring to FIG. 8B, a wearable device is worn on a wrist of a user while being fastened to a wrist band 570. At least one sensor 571 is included on one side of the wrist band 570. An on-body input area 572 may be defined as an inner area of the wrist or a palm of the user.

Figure 9:
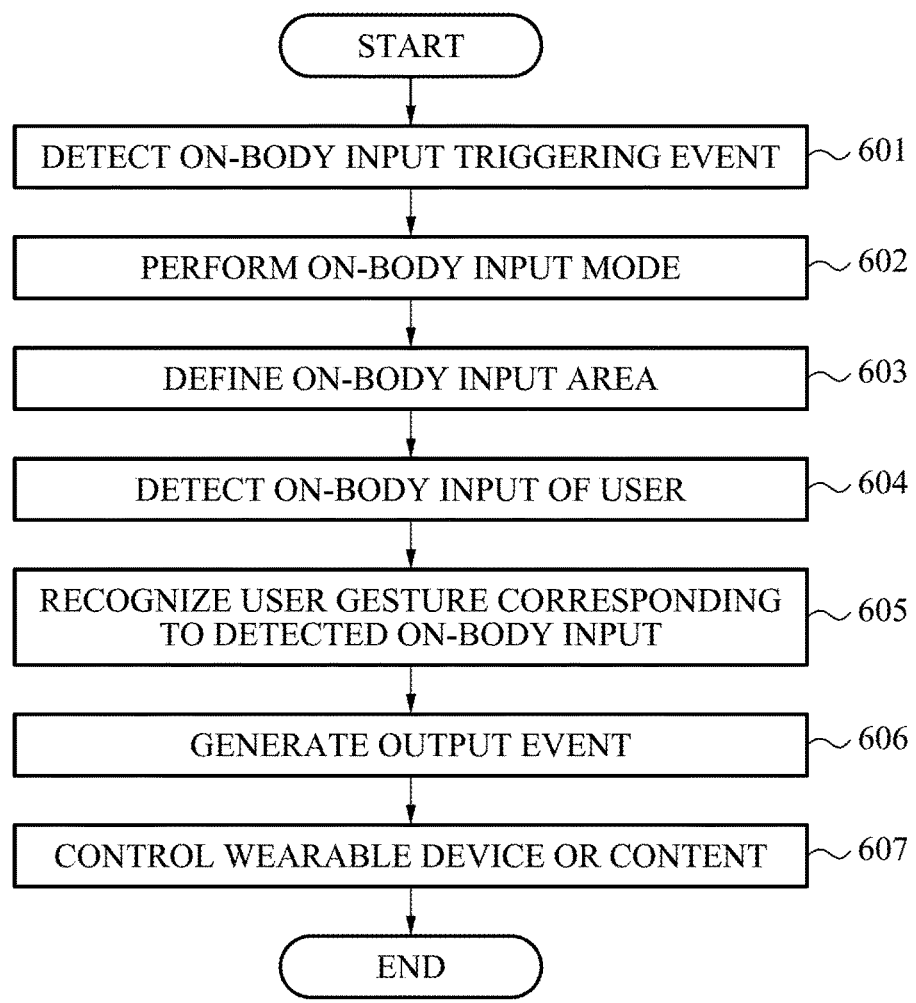
FIG. 9 is a diagram illustrating an example of a user input method of a wearable device.

FIG. 9 is a diagram illustrating an example of a user input method of a wearable device. Referring to FIG. 9, the user input method of the wearable device may include the following operations.

In operation 601, an on-body input triggering event is detected in a vicinity area of the wearing device. The on-body input triggering event of operation 601 will be described in detail with reference to FIGS. 10A through 10D.

<On-Body Input Triggering of Wearable Device for On-Body Input>

FIGS. 10A through 10D illustrate examples of a method of triggering a user input method of a wearable device.

Figure 10A:
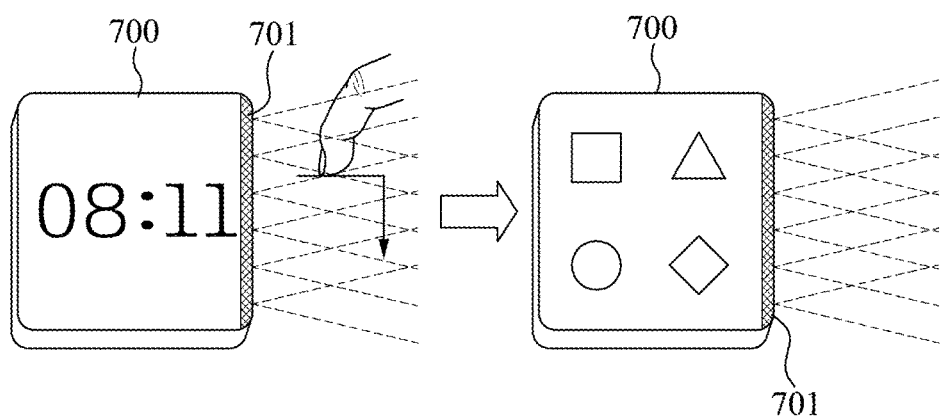
FIGS. 10A through 10D illustrate examples of a method of triggering a user input method of a wearable device.

Referring to FIG. 10A, a predetermined user gesture may be detected in a vicinity area that may be sensed by at least one sensor 701 of a wearable device 700. An input area definer of the wearable device 700 may analyze the user gesture sensed by the sensor 701, and determine whether the sensed user gesture corresponds to an on-body input mode triggering event.

Figure 10B:
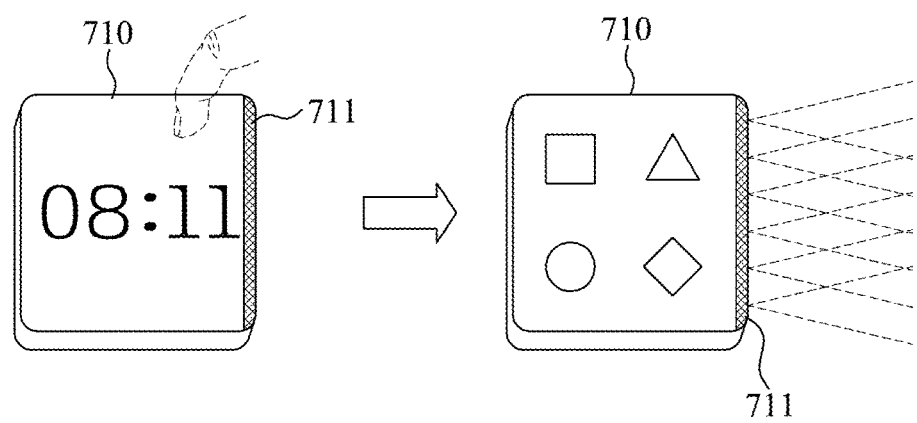

Referring to FIG. 10B, a predetermined user gesture is detected on a touchscreen of a wearable device 710 including at least one sensor 711. An input area definer of the wearable device 710 may analyze the user gesture input on the touchscreen, and determine whether the user gesture corresponds to an on-body input mode triggering event.

Figure 10C:
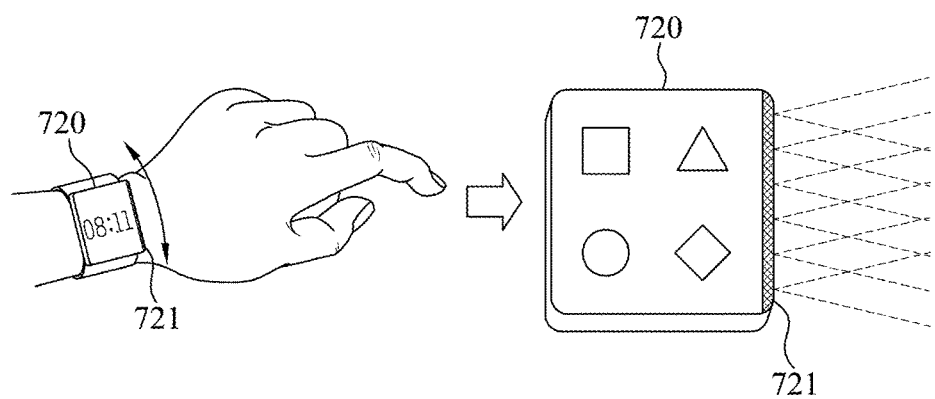

Referring to FIG. 10C, a predetermined EMG signal of a user may be detected by an EMG sensor of a wearable device 720 including at least one sensor 721. An input area definer of the wearable device 720 may analyze the EMG signal of the user sensed by the EMG sensor, and determine whether the detected EMG signal of the user corresponds to a triggering event. As described with reference to FIG. 2, the EMG sensor may be disposed physically apart from the at least one sensor 721. The EMG sensor may be included in the wearable device 720 at an optimal location to detect an EMG signal of a user.

Figure 10D:
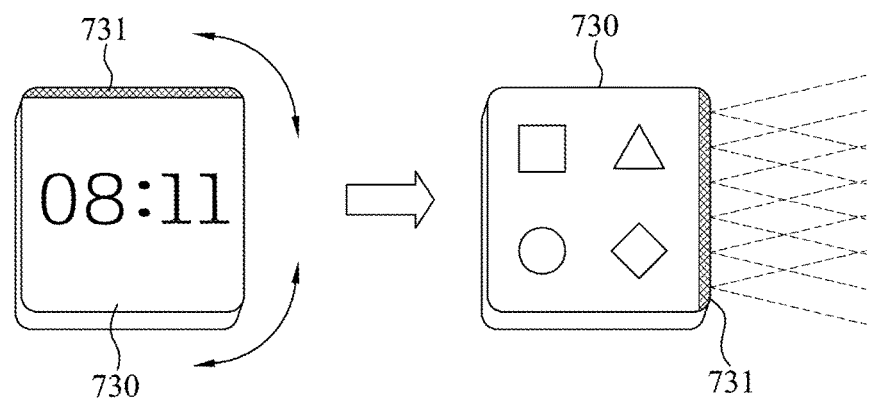

Referring to FIG. 10D, a physical displacement of a wearable device 730 may be detected in a physically-combined structure included in the wearable device 730 including at least one sensor 731. The wearable device 730 may be implemented in a form of a swivel. When an upper bezel of the wearable device 730 rotates for example, 90 degrees, on a fixing portion, an input area definer of the wearable device 730 may analyze a physical displacement of the upper bezel and determine that a triggering event occurs.

Referring to FIG. 9 again, when a triggering event is detected in operation 601, the wearable device enters, for example, an on-body input mode, in operation 602. A sensor of the wearable device may be in an always-on state. For power management, when the wearable device enters the on-body input mode in operation 602, the sensor may be in an on state.

When the wearable device enters an on-body input mode, the wearable device defines an on-body input area based on a location of the activated sensor and a sensing range of the sensor, in operation 603. A size of the on-body input area may vary depending on a shape of a back of a hand of a user, which will be described with reference to FIGS. 11A through 11B.

Figure 11A:
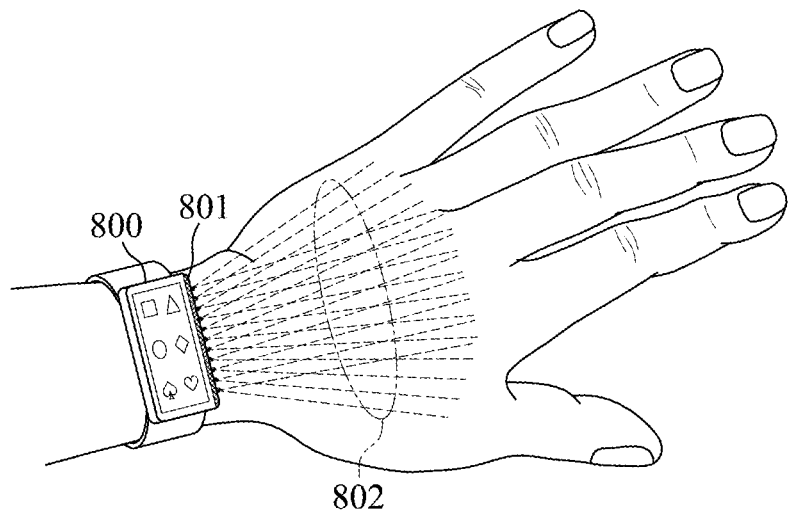
FIGS. 11A through 11B illustrate examples of a method of determining an on-body input area of a wearable device.
Figure 11B:
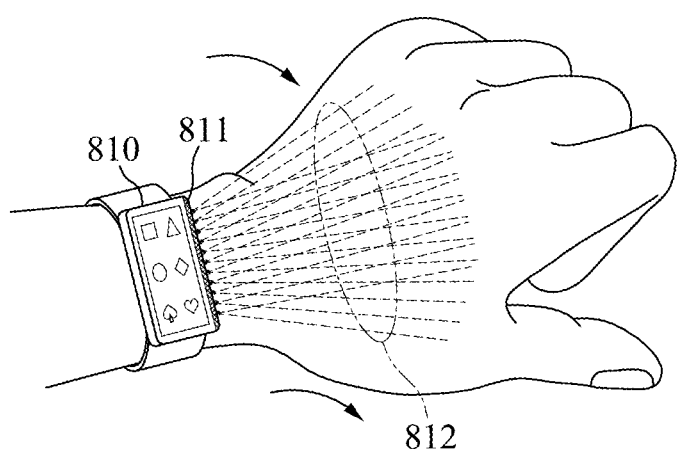

FIGS. 11A through 11B illustrate examples of a method of defining a user input area of a wearable device.

Referring to FIG. 11A, a method of defining an on-body input area 802 when a user bends a wrist toward a back of a hand is illustrated. A motion factor, for example, a motion of the wrist of the user, may be sensed using an EMG sensor of a wearable device 800. When the wrist of the user is bent in a direction of the back of the hand, a motion factor corresponding to the wrist being bent in the direction of the back of the hand may be detected through the EMG sensor. In this example, the on-body input area 802 sensed through at least one sensor 801 may be narrowed, when compared to a case in which the back of the hand is flattened, although a difference may exist depending on a sensing range of the sensor 801.

Referring to FIG. 11B, a method of defining an on-body input area 812 when a user bends a wrist toward a palm is illustrated. A motion factor, for example, a motion of the wrist of the user, may be sensed using an EMG sensor of a wearable device 810. When the wrist of the user is bent in a direction of the palm, a motion factor corresponding to the wrist being bent in the direction of the palm may be detected through the EMG sensor. In this example, the on-body input area 812 sensed through a sensor 811 may be broadened, when compared to a case in which a back of a hand is flattened, although a difference may exist depending on a sensing arrange of the sensor 811.

An input area definer of a wearable device may sense a motion factor corresponding to a wrist being bent through an EGM sensor, and define an on-body input area differently based on the wrist being bent, as illustrated in FIGS. 11A through 11B.

Referring to FIG. 9, in operation 604, the wearable device detects an on-body input of a user in the on-body input area defined in operation 603. The on-body input may include a tapping input of the user with respect to predetermined coordinates in the on-body input area, a continuous gesture input in the on-body input area, a hovering input in the on-body input area, and a rubbing input in the on-body input area. Examples of the on-body input of the user will be described with reference to FIGS. 12A through 12D.

FIGS. 12A through 12D illustrate examples of a method of detecting a user input in a user input method of a wearable device.

Figure 12A:
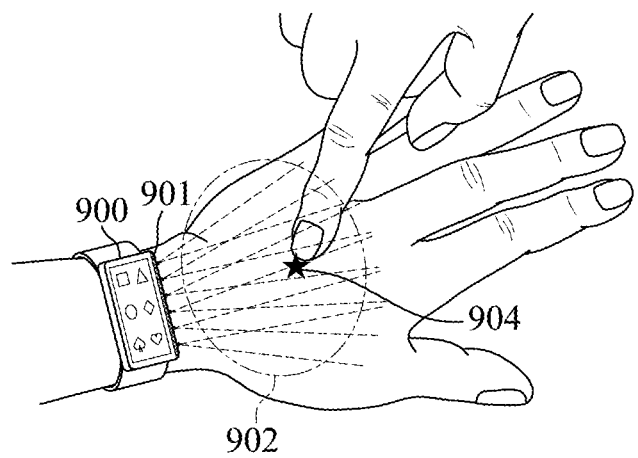
FIGS. 12A through 12D illustrate examples of a method of detecting a user input in a user input method of a wearable device.

Referring to FIG. 12A, a tapping input 904 of a user with respect to predetermined coordinates occurs in an on-body input area 902 disposed in a vicinity area of at least one sensor 901 of a wearable device 900.

Figure 12B:
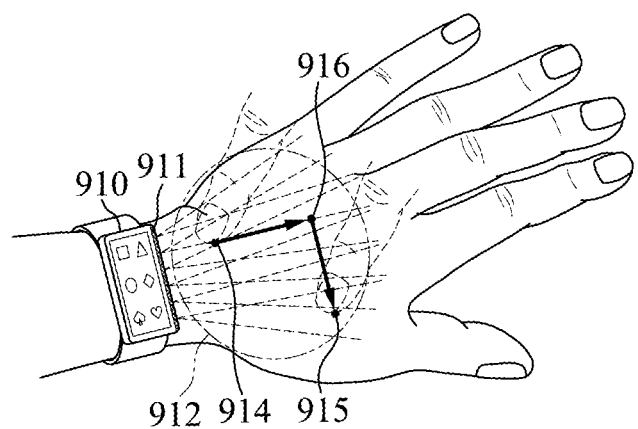

Referring to FIG. 12B, a continuous gesture input is provided by a user in an on-body input area 912 disposed in a vicinity area of at least one sensor 911 of a wearable device 910. In a case of the continuous gesture input of the user, the sensor 911 may detect a start point 914, an intermediate point 916, an end point 915, and a trajectory of the user gesture.

Figure 12C:
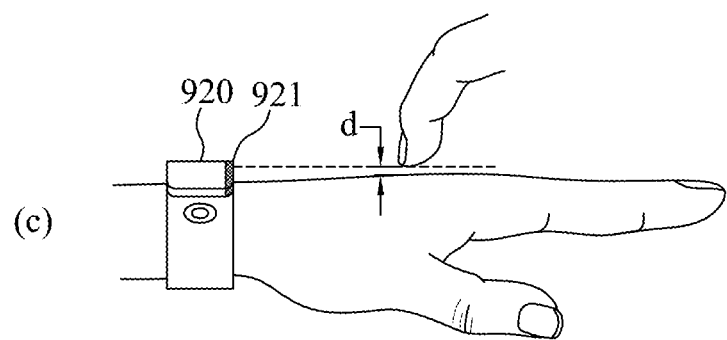

Referring to FIG. 12C, a hovering input of a user occurs in an on-body input area disposed in a vicinity area of at least one sensor 921 of a wearable device 920. The user may hold an object above the on-body input area so that the object is not physically in contact with the on-body input area. The sensor 921 may detect the object of the user disposed above the on-body input area (at a height d), and enable the wearable device 920 to operate in a hovering mode. When the wearable device 920 operates in a hovering mode, the wearable device 920 may display, in advance on a touchscreen, a candidate menu that may be input in an on-body input mode for the user.

Figure 12D:
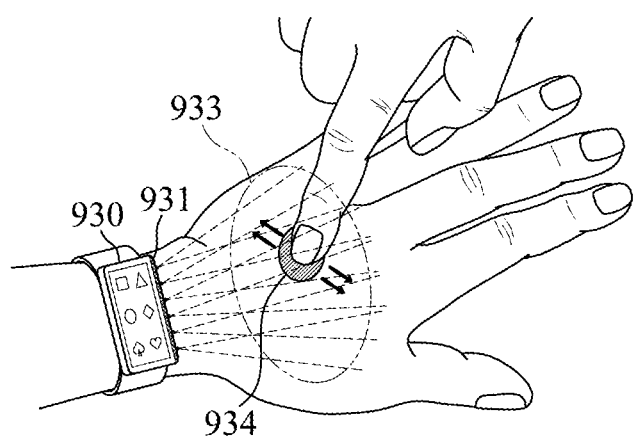

Referring to FIG. 12D, a rubbing input of a user is provided at a predetermined location 934 in an on-body input area 933 disposed in a vicinity area of at least one sensor 931 of a wearable device 930. The on-body input area 933 may be defined on skin of the user. Thus, an object, for example, a finger, may be disposed to be in contact with the predetermined location 934 and rubbed upward, downward, leftward, and rightward using an elasticity of the skin of the user. When the rubbing input of the user is provided in the on-body input area 933, the wearable device 930 may perform a predetermined function. For example, a function such as volume control, screen brightness adjustment, or zoom-in/zoom-out control may be performed.

Referring to FIG. 9, in operation 605, the wearable device recognizes a user gesture corresponding to the on-body input of the user detected in operation 604. When an on-body input of a user is not recognized or an on-body input of a user is performed at a location other than the on-body input area in operation 605, the wearable device may inform the user that an on-body input is to be re-performed, by providing a feedback, such as, for example, a visual feedback, an auditory feedback, and/or a tactile feedback to the user.

In operation 606, the wearable device generates an output event, for example, a control instruction, corresponding to the recognized user gesture. In operation 607, the wearable device controls an operation of the wearable device or various items of content output from the wearable device based on the generated output event.

Figure 13:
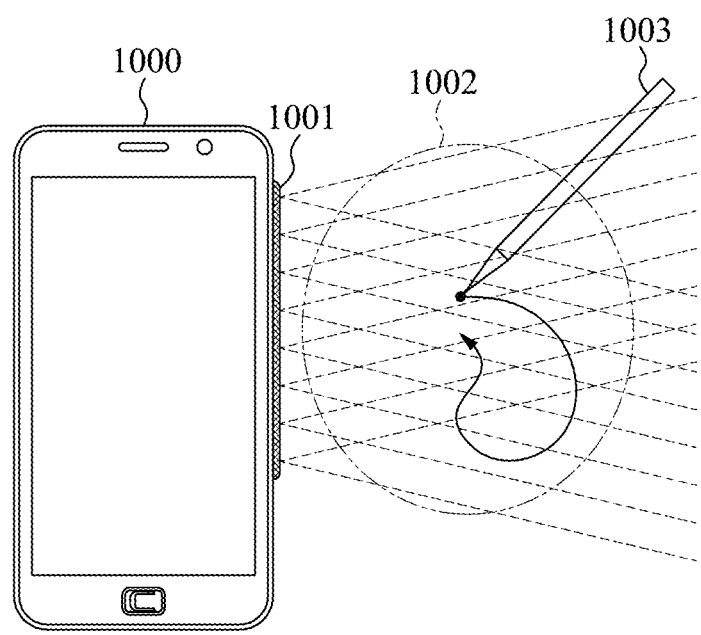
FIG. 13 illustrates an example of a portable device to which a user input method is applied.

FIG. 13 illustrates an example of a portable device to which a user input method is applied. The portable device may include a tablet PC 1000. A sensor 1001 may be disposed on one side of the tablet PC 1000. An input area 1002 corresponding to the on-body input area described above may be defined in a vicinity area of the sensor 1001. A user may perform an input in the input area 1002 using an object as a user input device, for example, a finger or a pen 1003. In the example of FIG. 13, without hardware specially designed for writing on a touchscreen of the tablet PC 1000, a number or a character may be input into the tablet PC 1000 using the user input device 1003 in the input area 1002 corresponding to the vicinity area of the tablet PC 1000.

According to a general aspect, a user input method of a portable device may extend an input area of a touchscreen to a vicinity area of the portable device.

According to another general aspect, a user input method of a wearable device may extend an input area of a touchscreen to an on-body input area corresponding to at least a portion of a vicinity area of the wearable device.

According to still another general aspect, a user input method of a portable device may enable various types of user inputs to be provided to a portable device including a capacitive touchscreen.

According to yet another general aspect, a user input method of a portable device may alleviate an inconvenience in a user gesture input through a small touchscreen.

The portable device described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described herein may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes embodied herein, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A portable device comprising:
an input area definer configured to define an on-body input area in a vicinity of the portable device;
a sensing unit configured to sense a gesture being input onto the on-body input area through at least one sensor;
a recognizer configured to detect a trajectory of the gesture, and to recognize the gesture based on the trajectory; and
an output unit configured to output a control instruction corresponding to the recognized gesture to control the portable device,
wherein the sensing unit is further configured to detect a motion factor corresponding to a shape of a user body, and the input area definer is configured to define a size of the on-body input area differently according to the shape of the user body,
wherein the on-body input area becomes narrower in response to the user body being bent toward the portable device, and
wherein the on-body input area becomes broader in response to the user body being bent away from the portable device.

2. The portable device of claim 1, further comprising:
a memory configured to record at least one predefined user gesture and the control instruction corresponding to the recognized gesture,
wherein the output unit is configured to read and output the control instruction corresponding to the gesture by referring to the memory.

3. The portable device of claim 1, wherein the sensing unit is configured to operate in response to a triggering event input from a user.

4. The portable device of claim 3, wherein the sensing unit further comprises a motion sensor configured to sense a motion of the portable device.

5. The portable device of claim 4, wherein the motion sensor corresponds to an acceleration sensor, and
the triggering event corresponds to a predetermined motion of the portable device.

6. The portable device of claim 4, wherein the sensing unit further comprises an electromyography (EMG) sensor, and
the triggering event corresponds to a predetermined EMG signal value of the user.

7. The portable device of claim 1, wherein the input area definer is configured to divide the on-body input area into a predetermined number of cells, and
the recognizer is configured to recognize the gesture based on cells in which an user input is sensed.

8. The portable device of claim 7, wherein the on-body input area is divided into one of 2×2 cells, 3×3 cells, 1×2 cells, 2×1, and 3×4 cells.

9. The portable device of claim 7, wherein the cells are set based on curves of knuckles corresponding to a portion of the on-body input area.

10. The portable device 7, wherein the recognizer is configured to recognize the trajectory of the gesture passing through the cells.

11. The portable device of claim 1, wherein the input area definer is configured to modify the on-body input area based on a motion factor of the user.

12. The portable device of claim 11, wherein the motion factor indicates a state in which a wrist of the user is bent toward a surface on which the portable device is worn, and
the input area definer is configured to define the on-body input area by extending the on-body input area to be greater than a default area.

13. The portable device of claim 11, wherein the motion factor indicates a state in which a wrist of the user is bent away from a surface on which the portable device is worn, and
the input area definer is configured to define the on-body input area by reducing the on-body input area to be smaller than a default area.

14. The portable device of claim 1, wherein the at least one sensor comprises at least one of an infrared (IR) sensor, an ultrasonic sensor, an acoustic sensor, a dynamic vision sensor (DVS), a linear sensor, an image sensor, a reticular sensor, and a three-dimensional (3D) sensor, or a combination thereof with a lens.

15. The portable device of claim 1, wherein the recognizer comprises an object recognizer configured to recognize an object used to perform an user input in the on-body input area.

16. The portable device of claim 1, wherein an user input comprises an input of disposing an object to be used to perform the user input on or above the on-body input area, and
the output unit is configured to additionally output at least one candidate user gesture.

17. The portable device of claim 16, wherein the output unit is configured to output the candidate user gesture through one of a visual feedback, an auditory feedback, and a tactile feedback.

18. The portable device of claim 1, wherein the portable device is a wearable device.

19. The portable device of claim 18, wherein the sensing unit is disposed on one side of a band of the wearable device.

20. The portable device of claim 1, wherein the input area definer is further configured to normalize a curve of the on-body input area and to determine whether a presence of an object in the on-body input area comprises a gesture.

21. The portable device of claim 20, wherein the input area definer is further configured to determine that the presence of the object in the on-body input area comprises the gesture, in response to the object being sensed to remain in the on-body input area for a time greater than a threshold.

22. The portable device of claim 20, wherein the input area definer is further configured to determine that the presence of the object in the on-body input area comprises the gesture, in response to the object being detected at more than one location on the on-body input area within a time period.

23. The portable device of claim 1, wherein the recognizer is further configured to recognize the gesture based on a change of angle of the on-body input area.

24. The portable device of claim 23, wherein the recognizer is further configured to recognize the gesture based on an object hovering on or around the on-body input area.

25. The portable device of claim 1, wherein the input area definer is further configured to define the on-body input area based on a shape of a user body corresponding to at least a portion of the vicinity.

26. The portable device of claim 1, wherein the input area definer is further configured to adaptively divide the on-body input area into an invisible cells based on curves of the user body.

27. The portable device of claim 26, wherein the input area definer is further configured to divide the on-body input area into the invisible cells based on protruding portions and recessed portions of a knuckle of the user body, and at least one of the invisible cells is mapped into at least one of the protruding portions and the recessed portions of the knuckle.

28. The portable device of claim 1, wherein the size of the on-body input area varies based on whether a direction of the user body being bent is toward the portable device or opposite the portable device.

29. A portable device comprising:
- a sensing unit comprising a 3D sensor designed in a multilayer structure;
- a memory configured to record a program to control the portable device or at least one external device connected to the portable device using short-range communication based on a user input provided through an on-body input area in a vicinity area of the portable device; and
- a processor configured to execute the program to define the on-body input area, sense a gesture being input onto the on-body input area using the sensing unit, detect a trajectory of the gesture, recognize the gesture based on the trajectory, and output a control instruction corresponding to the gesture, wherein the sensing unit is configured to sense a three-dimensional (3D) location on x, y, and z axes corresponding to the user input by using the 3D sensor, and wherein the processor is further configured to detect the trajectory of the gesture based on the 3D location, wherein the sensing unit is further configured to detect a motion factor corresponding to a shape of a user body, and the processor is further configured to define a size of the on-body input area differently according to the shape of the user body, wherein the on-body input area becomes narrower in response to the user body being bent toward the portable device, and wherein the on-body input area becomes broader in response to the user body being bent away from the portable device.

* * * * *